(12) United States Patent
Warmerdam (10) Patent No.: US 10,056,004 B2
(45) Date of Patent: Aug. 21, 2018

(54) MOTION SIMULATOR (71) Applicant: MOOG BV, Nieuw-Vennep (NL)

(72) Inventor: Jean Paul Warmerdam, Nieuw-Vennep (NL)

(73) Assignee: Moog BV, Nieuw-Vennep (NL)

( * ) Notice: Subject to any disclaimer, the term of this patent is extended or adjusted under 35 U.S.C. 154(b) by 126 days.

(21) Appl. No.: 14/759,663

(22) PCT Filed: Aug. 23, 2013

(86) PCT No.: PCT/EP2013/067521
§ 371 (c)(1),
(2) Date: Jul. 8, 2015

(87) PCT Pub. No.: WO2013/178828
PCT Pub. Date: Dec. 5, 2013

(65) Prior Publication Data
US 2015/0356878 A1    Dec. 10, 2015

(30) Foreign Application Priority Data

Jan. 14, 2013  (GB) .................................. 1300552.5

(51) Int. Cl.
| G09B 9/00 | (2006.01) |
| G09B 9/12 | (2006.01) |
| G09B 9/14 | (2006.01) |
| G09B 9/02 | (2006.01) |

(52) U.S. Cl.
CPC ................. *G09B 9/00* (2013.01); *G09B 9/12* (2013.01); *G09B 9/14* (2013.01); *G05B 2219/50162* (2013.01); *G09B 9/02* (2013.01)

(58) Field of Classification Search
CPC ...... B25J 9/1623; B25J 9/0057; B25J 9/0042; B25J 9/0066; B25J 17/0216; Y10T 409/309576; G01B 9/02; G01B 9/04; G01B 2219/50162
See application file for complete search history.

(56) References Cited

U.S. PATENT DOCUMENTS

| RE27,051 E  * | 2/1971 | Cappel ..................... B64G 7/00 434/58 |
| 4,753,596 A | 6/1988 | Hart et al. |
| 5,490,784 A | 2/1996 | Carmein |
| 5,797,191 A  * | 8/1998 | Ziegert .................. G01B 5/008 33/503 |
| 6,533,670 B1 | 3/2003 | Drobnis |
| 2008/0093322 A1* | 4/2008 | Ehrenleitner ........ B25J 17/0266 212/274 |
| 2008/0268404 A1 | 10/2008 | Burt |

(Continued)

FOREIGN PATENT DOCUMENTS

| CA | 2837018 | 11/2012 |
| FR | 2677155 | 12/1992 |
| GB | 1160471 | 8/1969 |

(Continued)

*Primary Examiner* — Peter Macchiarolo
*Assistant Examiner* — Nathaniel Kolb
(74) *Attorney, Agent, or Firm* — Hodgson Russ LLP (57) ABSTRACT

A motion simulator is constructed from a base driving an intermediate member via a 6 DOF hexapod, and a platform driven by a 2DOF simulator is provided on the intermediate member to supplement pitch and roll.

17 Claims, 6 Drawing Sheets

(56) References Cited

U.S. PATENT DOCUMENTS

2008/0290221 A1* 11/2008 Dupuis ................ B64G 1/222
  244/172.6
2012/0301853 A1   11/2012 Garvis et al.

FOREIGN PATENT DOCUMENTS

JP    H06230713    8/1994
JP    H09160478    6/1997

* cited by examiner

MOTION SIMULATOR

CROSS-REFERENCE TO RELATED APPLICATIONS

The present application is the U.S. national phase of International Application No. PCT/EP2013/067521 filed Aug. 23, 2013, which claims priority of British Application No. 1300552.5 filed Jan. 14, 2013, the entirety of which is incorporated herein by reference.

FIELD OF THE INVENTION

The present invention is concerned with a motion simulator. More specifically the present invention is concerned with a motion simulator for applications requiring a large excursion in at least one rotational degree of freedom.

BACKGROUND OF THE INVENTION

Motion simulators are well known in the art. The Stewart platform (or hexapod) is a well known form of simulator which moves a platform relative to a base. Hexapods have six linear actuators arranged to move the platform in six degrees of freedom (three linear, three rotational) relative to the base depending on which actuators are used in combination. The translational degrees of freedom are commonly known as surge (horizontal movement in the direction of travel), sway (horizontal movement perpendicular to the direction of travel) and heave (vertical motion). The rotational degrees of freedom are known as roll (rotation about an axis parallel to the direction of travel), pitch (rotation about a horizontal axis perpendicular to the direction of travel) and yaw (rotation about a vertical axis).

Hexapods have finite workspaces defined by the maximum and minimum excursion of the platform, which in turn is defined by the limit of travel of the actuators. For larger workspaces requiring further platform movement in any given degree of freedom, it is known to provide longer hexapod actuators. Although this may achieve the desired result, it substantially increases the cost of the simulator (longer linear actuators are significantly more expensive than short ones), and can sometimes decrease its inherent stiffness. In some cases, hexapods are simply unsuitable for the required degree of excursion.

Stiffness is an important property of the simulator, because it minimises undesirable vibration and oscillation of the platform, which would otherwise provide false accelerations, and forces on the subject. In known Stewart platforms there is therefore a trade off between maximum platform excursion and stiffness.

There are various simulations which require a high excursion, or degree of travel, in a specific rotational degree or degrees of freedom. This can be used to simulate gravity or radial accelerations. For example, fuel tank testing, battery testing, fuel metering system testing, inertia measurements of equipment, testing instruments, fixation methods testing, equipment containing/depending on liquids or magnets and any equipment that requires an artificial horizon all require potentially large platform movements in the global roll and pitch degrees of freedom. Providing a hexapod with long stroke actuators would provide the required functionality to a certain extent, but not in all cases. Large hexapods would also provide functionality which is not required—namely additional travel in the remaining four degrees of freedom.

As such, there is competing requirement to provide a stiff, compact and inexpensive simulator on the one hand, and to provide additional movement in the roll and pitch degrees of freedom on the other hand.

SUMMARY OF THE INVENTION

It is an aim of the present invention to overcome, or at least mitigate this problem.

According to a first aspect of the invention there is provided a motion simulator comprising:

a base and an intermediate member connected to the base by a hexapod, the hexapod being configured to move the intermediate member in six global degrees of freedom relative to the base, the six global degrees of freedom including roll, pitch and yaw;

a platform connected to the intermediate member for movement in at least one local rotational degree of freedom relative thereto; a supplementary actuation assembly arranged to move the platform relative to the intermediate member in the at least one local rotational degree of freedom, so as to supplement global movement of the platform in at least one of the global roll and pitch degrees of freedom.

Advantageously, the provision of a movable platform on an intermediate member allows a greater range of movement of the platform. It will be noted that although the hexapod is a parallel manipulator (thus providing the required stiffness), the intermediate member and platform are coupled in series (providing a high range of movement). In the embodiment discussed below, a 6 degree of freedom hexapod is supplemented by a 2 degree of freedom system constrained by a universal joint.

Preferably, the platform and intermediate member are connected by a joint is fixed to the intermediate member at a first side, and fixed to the platform at a second side, which joint has degrees of freedom in the local pitch and roll axes of the intermediate member.

Preferably the supplementary actuation assembly comprises a first supplementary linear actuator mounted to the intermediate member at a first end and to the platform at a second end. More preferably the platform is connected to the intermediate member via a joint, and in which the first supplementary linear actuator is connected to the platform at a position spaced from the joint so as to produce a moment on the platform. This results in a rotation of the platform using a linear actuator.

Preferably the joint is a universal joint, such as a cardan joint or a spherical joint. This allows rotation of the platform in two notional horizontal degrees of freedom of the intermediate member only. The term "universal joint" is used here to denote a joint having at least two rotational degrees of freedom. Preferably the platform is constrained relative to the intermediate member in all local degrees of freedom except roll and pitch.

Alternatively the joint may be a joint constrained in all but one rotational degree of freedom—i.e. a hinge joint.

Preferably the supplementary actuation assembly is a parallel manipulator having at least two functionally parallel actuators. In this context, "functionally parallel" means operating in parallel—i.e. both being joined to the intermediate member and platform. This further enhances the stiffness of the overall manipulator. Preferably the hexapod and the supplementary actuation assembly overlap in three dimensional space. This provides a stiff, compact arrangement. Preferably the actuators are not parallel in a geometric sense—i.e. they are at an oblique angle relative to each other.

The supplementary actuation assembly may comprise a second supplementary linear actuator mounted to the intermediate member at a first end and to the platform at a second end. Preferably the second ends of the first and second actuators are spaced apart on the platform. Combinations of movement of the first and second actuators can thereby move the platform in the two degrees of freedom.

Preferably the hexapod is attached to the intermediate member at least three fixing points defining a first plane, and in which the first end or ends of the supplementary linear actuator or actuators are positioned on a first side of the first plane, opposite to the platform.

Preferably the hexapod is attached to the intermediate member at least three fixing points defining a first plane, and in which the supplementary actuation assembly crosses the first plane. More preferably the at least three fixing points define a first surface bounded by lines joining the at least three fixing points, and in which the supplementary actuation assembly crosses the first surface. This provides a stiff, compact simulator.

Preferably the intermediate member comprises a central region and a plurality of legs, in which the hexapod is attached to the legs. This allows for a lightweight intermediate member with low inertia, and also allows the supplementary actuation assembly to pass between the legs to make a more compact simulator. The legs may extend in the local horizontal plane of the intermediate member.

Preferably the intermediate member comprises a leg extending into a volume defined by the hexapod, in which the supplementary actuation assembly is attached to the leg. By "volume defined by the hexapod" we mean a notional three dimensional space bounded by the hexapod actuators. Such a volume is bounded by surfaces extending the shortest possible distance between adjacent actuators, and by a top surface joining the three areas where pairs of actuators are attached to the intermediate member.

Preferably the supplementary actuation assembly is attached to the leg at a foot, the foot defined at an end distal to the platform.

Preferably the supplementary actuation assembly is configured to actuate the platform relative to the intermediate member about two notional horizontal axes in the local coordinate system of the intermediate member.

Preferably the hexapod comprises a plurality of linear actuators, in which the supplementary actuation assembly comprises at least one linear actuator having an excursion less than any of the linear actuators of the hexapod. In other words, instead of the prior art approach of providing six longer actuators in the hexapod, six "normal" length actuators are supplemented by two further actuators. Provision of 8 normal-length actuators instead of 6 longer actuators is both less expensive and stiffer.

Preferably at least one of the hexapod and supplementary actuation assembly comprises at least one linear actuator, the at least one linear actuator comprising an electric motor driving a ball screw to advance a piston.

BRIEF DESCRIPTION OF THE DRAWING VIEWS

An example motion simulator according to the present invention will now be described by way of example with reference to the accompanying figures in which.

DETAILED DESCRIPTION OF THE INVENTION

Figure 1:
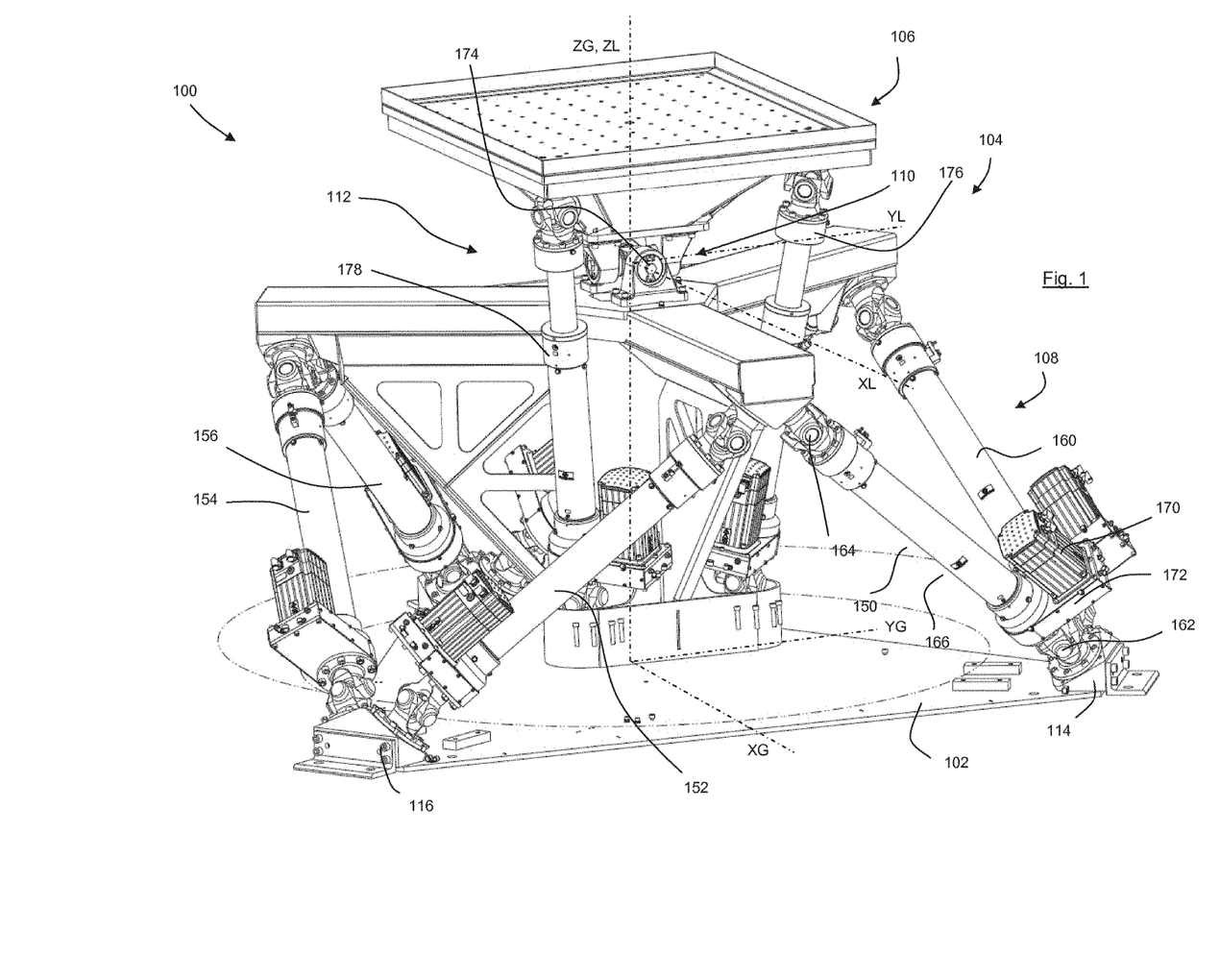
FIG. 1 is a perspective view of a motion simulator in accordance with the present invention.

Turning to FIG. 1, a motion simulator 100 generally comprises a base 102, an intermediate member 104, and a platform 106. The intermediate member 104 and the base 102 are joined and driven by a hexapod 108 and the platform 106 and the intermediate member 104 are joined by a joint assembly 110 and driven by supplementary actuation assembly 112.

Figure 2:
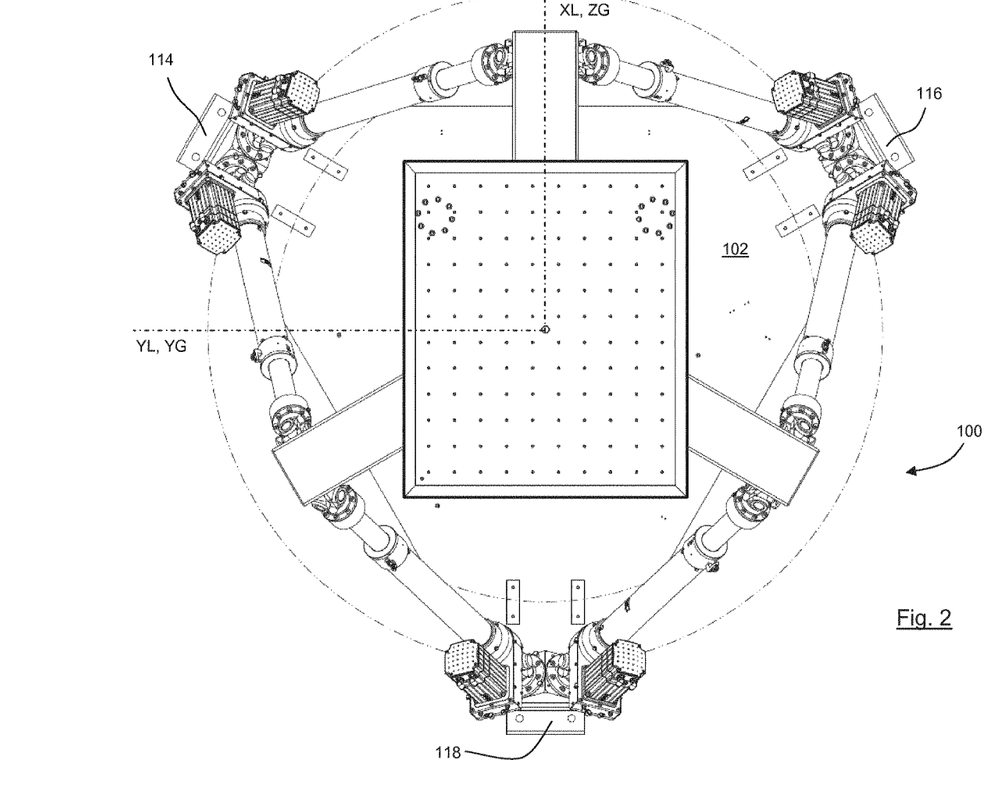
FIG. 2 is a plan view of the motion simulator of FIG. 1.
Figure 3:
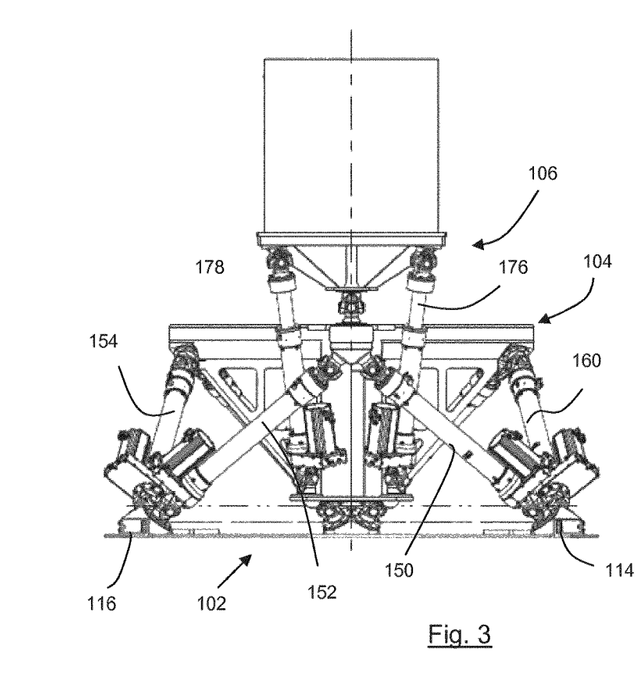
FIG. 3 is a front view of the motion simulator of FIG. 1.
Figure 4:
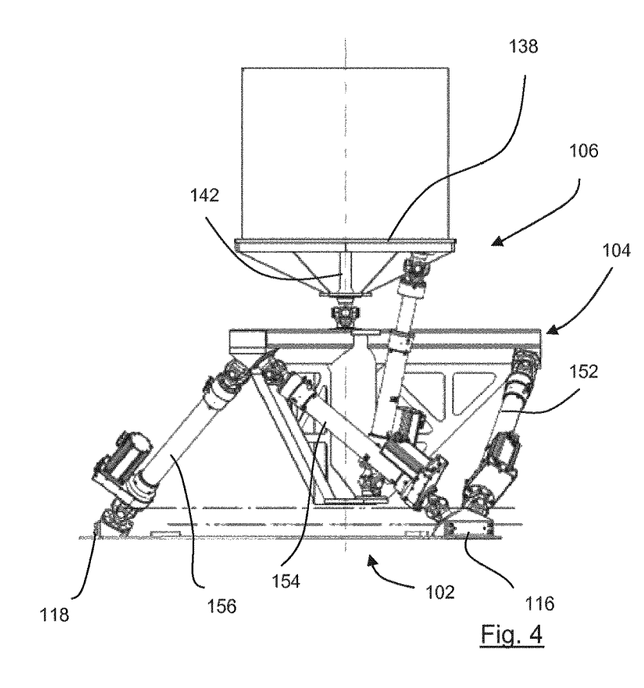
FIG. 4 is a side view of the motion simulator of FIG. 1.

The base 102 is generally triangular in shape having a first, second and third vertex 114, 116, 118 respectively, as shown in FIG. 2. The base 102 is attached to a solid immoveable surface such as the floor of a workshop by a known method. The base is positioned to globally immovable global axes XG, YG and ZG. Rotation about XG is roll, and rotation about YG is pitch. Rotation about ZG is yaw.

Figure 6:
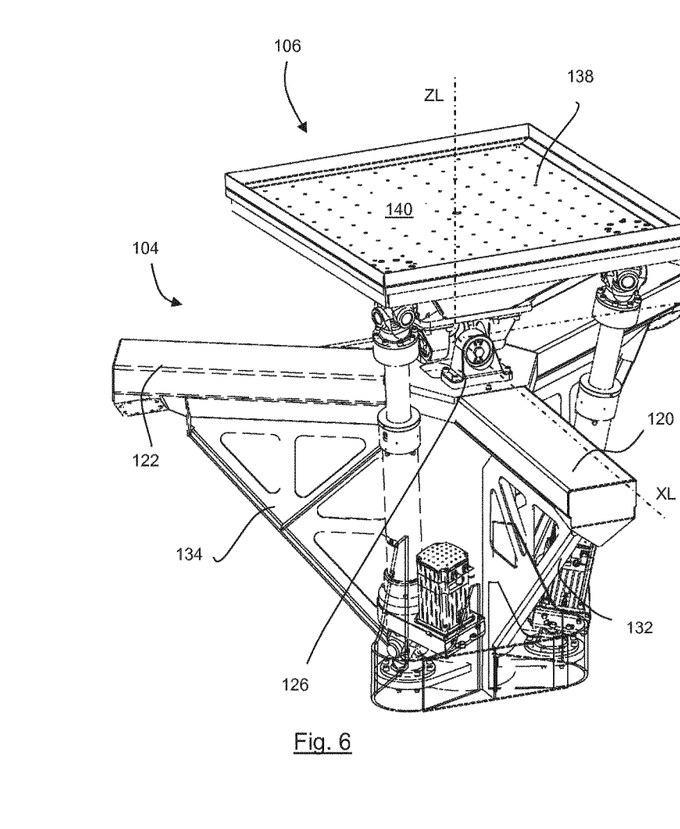
FIG. 6 is a first perspective view of a sub-assembly of the motion simulator of FIG. 1.
Figure 7:
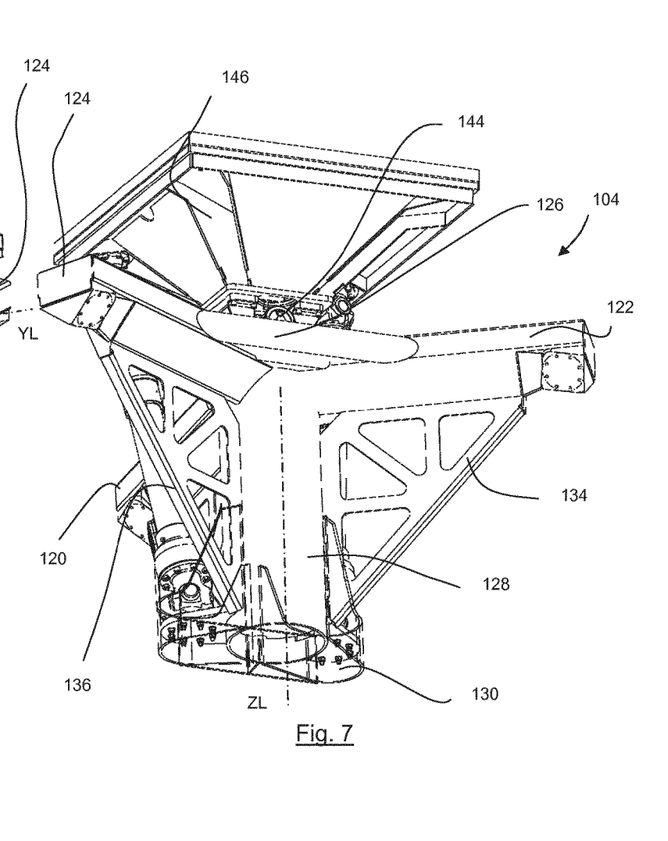
FIG. 7 is a further perspective view of a sub-assembly of a motion simulator of FIG. 1.

The intermediate member 104 is shown in more detail in FIGS. 6 and 7. The intermediate member 104 comprises three arms 120, 122, 124 respectively, extending radially from a central region 126. The intermediate member 104 has a notional local co-ordinate system having axes XL, YL and ZL, which is slightly vertically offset from the top of the central region 126. The local coordinate system moves with the intermediate member 104. In the neutral position shown in FIG. 1, ZG and ZL are aligned, XG and XL are parallel, and YG and YL are parallel.

Each of the arms 120, 122, 124 are equally spaced about the local vertical axis ZL. Extending from the central region 126, parallel to and along the local vertical axis ZL, there is provided a leg 128. The leg is tubular and cylindrical and terminates in a foot 130 at an end opposite to the arms 120, 122, 124 and central region 126. The foot 130 is in the form of a radially extending flange.

Extending in the 90 degree corner defined between the leg 128 and each individual arm 120, 122, 124, there is provided a web 132, 134, 136 respectively which acts to stiffen the intermediate member 104.

The platform 106 comprises a plate member 138 which has a generally flat support surface 140. The platform 106 defines a support 142 extending from the plate member 138 opposite to the support surface 140. The support 142 is a generally solid, cylindrical member. The support 142 terminates in a platform joint flange 144. A plurality of webs 146 extend between the platform joint flange 144, support 142, and the underside of the member 138 opposite the support surface 140.

The hexapod 108 comprises six linear actuators 150 to 160 respectively. Each of the linear actuators is substantially identical and, as such, only the actuator 150 will be described here, with reference to FIG. 5. The linear actuator 150 comprises a first universal joint 162 and a second universal joint 164. Universal joints 162, 164 are at opposite ends of the actuator 150. Intermediate the universal joints 162, 164, there is provided a cylinder 166 which houses a piston 168 (shown more clearly with respect to the third linear actuator 154 in FIG. 8). The piston 168 is mounted inside the cylinder 166 with a ball screw which is actuable via an electric motor 170 connected to the linear actuator 150 proximate the first universal joint 162. A belt drive 172 connects the motor 170 to the ball screw such that the piston 168 can be driven in and out of the cylinder 166 by the motor 170.

The joint assembly 110 comprises a universal joint 174 in the form of a cardan joint positioned on the local axis ZL and actuable about the local horizontal axes XL and YL.

Figure 5:
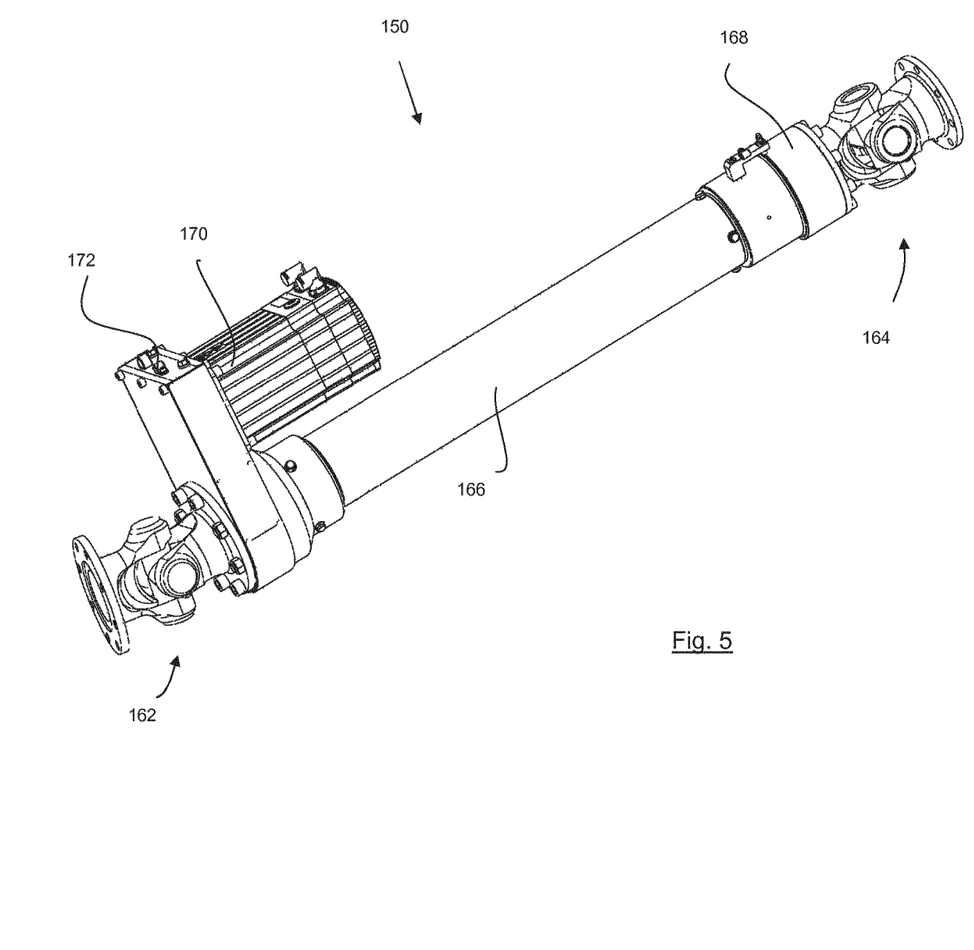
FIG. 5 is a perspective view of a part of the motion simulator of FIG. 1.
Figure 8:
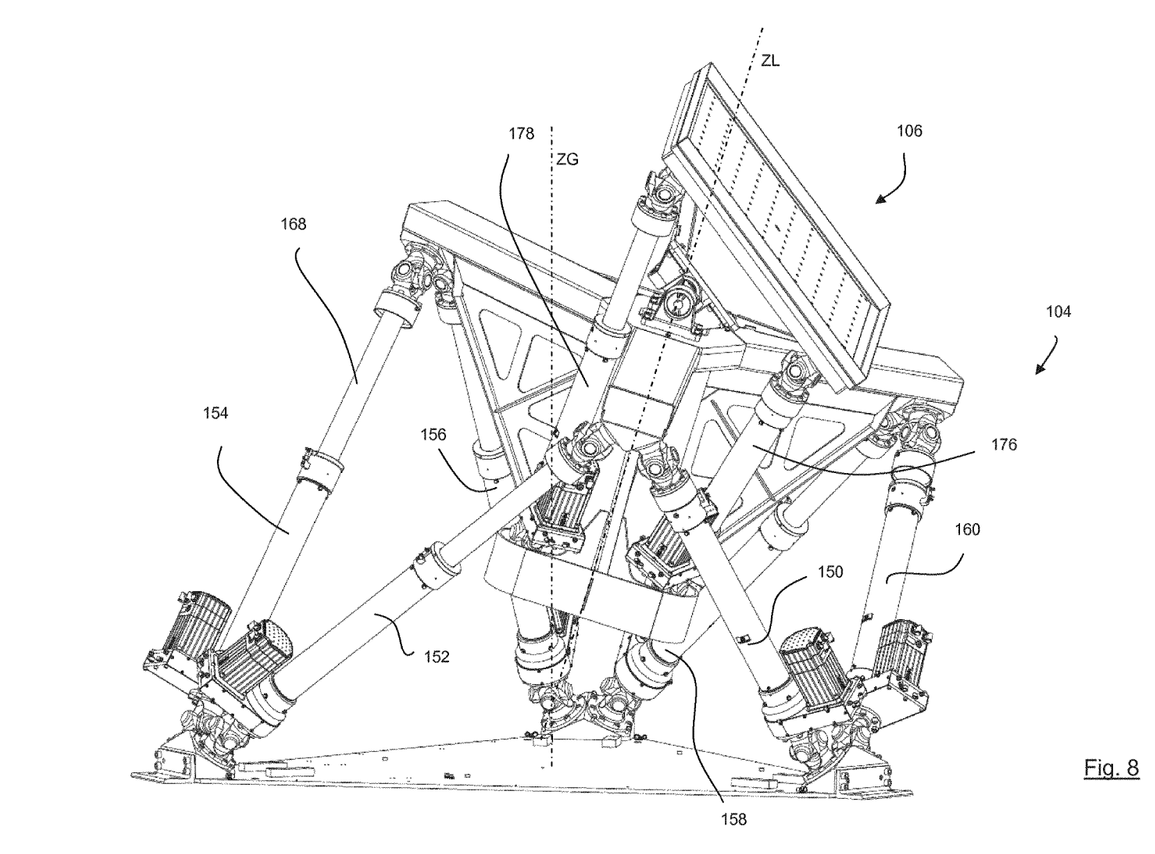
FIG. 8 is a perspective view of the motion simulator of FIG. 1 in an actuated state.

Referring to FIG. 8, the supplementary actuation assembly 112 comprises a first supplementary linear actuator 176 and a second supplementary linear actuator 178. The supplementary actuators 176, 178 are similar to the linear actuators 150 to 160 with the exception that they are generally shorter and have less travel; that is a lower range of motion from their compact state as shown in FIG. 5, to their extended state as shown, for example, in FIG. 8.

The motion simulator 100 is assembled as follows.

The base 102 is installed on a stationary, horizontal, flat surface such that it is immoveable in use. The intermediate member 104 is then suspended above the base 102 via the hexapod 108.

The actuators of the hexapod 108 are arranged as follows.

Firstly, the platform 106 is oriented such that each of the arms 120, 122, 124 is interspersed between two of the vertices 114, 116, 118 of the base 102 when viewed from above (see FIG. 2). The first actuator 150 then extends diagonally from the first vertex 114 to the end of the first arm 120. The second linear actuator 152 extends from the second vertex 116 to the first end of the first arm 120. The third linear actuator 154 extends from the second vertex 116 to the end of the second arm 122, and the fourth linear actuator 156 extends from the third vertex 118 to the end of the second arm 112. The fifth linear actuator 158 extends from the third vertex 118 to the end of the third arm 124 and finally, the sixth linear actuator 160 extends from the first vertex 114 to the end of the third arm 124. In this manner a hexapod or Stewart platform is formed. It will be noted that the volume formed by the hexapod defined by the linear actuators 150 to 160 is penetrated by the downwardly depending leg 128 of the intermediate member 104.

The platform 106 is then attached to the central region 126 of the intermediate member 104 via the joint assembly 110 for rotation about local axes XL and YL. The supplementary actuation assembly 112 is then installed in which the first supplementary linear actuator 176 extends from the foot 130 of the intermediate member 104 between the first and second arms 120, 122 of the intermediate member 104 to a corner of the plate member 138 of platform 106. Similarly, the second supplementary linear actuator 178 extends from the foot 130 of the intermediate member 104 between the second and third arms 122 and 124 of the intermediate member 104 to an adjacent corner of the plate member 138 of the platform 106.

The first and second supplementary actuators 176, 178 are at a mid-travel point when the platform 104 is horizontal. Retraction of the first supplementary actuator 176 and lengthening of the second supplementary actuator 178 rotates the platform 104 about local axis XL, and simultaneous lengthening or shortening of both supplementary actuators 176, 178 rotates the platform 104 about joint axis YL.

Roll of the intermediate member 104 about the axis XG via the hexapod, and roll of the platform 106 about the local axis XL relative to the intermediate member, is shown in FIG. 8. It will be noted that a large roll of the platform 106 about the global axis XG is achieved.

Variations fall within the scope of the present invention.

The free ends of the legs of the intermediate member 104 may be joined by a peripheral structure (which may be circular—i.e. a ring—or any other shape) which bounds the intermediate member.

In an alternative embodiment, motion of the universal joint 174 about the local horizontal axes XL and YL may be performed by a pair of motors with rotary output shafts directly driving the joint.

What is claimed is:

1. A motion simulator comprising:
    a base and an intermediate member connected to the base by a hexapod, the hexapod comprising six actuators and being configured to move the intermediate member in six global degrees of freedom relative to the base, the six global degrees of freedom including roll, pitch and yaw;
    a platform;
    a joint having a first side directly fixed to the intermediate member and a second side directly fixed to the platform, which joint has degrees of freedom in the local pitch and roll axes of the intermediate member, wherein the joint is constrained in all but two rotational degrees of freedom;
    a supplementary actuation assembly arranged to move the platform relative to the intermediate member in local pitch and roll axes of the intermediate member, so as to supplement global movement of the platform in at least one of the global roll and pitch degrees of freedom.

2. A motion simulator according to claim 1, in which the joint is a universal joint.

3. A motion simulator according to claim 2, wherein the universal joint is a cardan joint or a spherical joint.

4. A motion simulator according to claim 1, in which the supplementary actuation assembly comprises a first supplementary actuator configured to articulate the joint in at least one degree of freedom.

5. A motion simulator according to claim 4, in which the first supplementary actuator has a rotational output.

6. A motion simulator according to claim 1, in which the hexapod is attached to the intermediate member at at least three fixing points defining a first plane, and in which the supplementary actuation assembly crosses the first plane.

7. A motion simulator according to claim 6 in which the at least three fixing points define a first surface bounded by lines joining the at least three fixing points, and in which the supplementary actuation assembly crosses the first surface.

8. A motion simulator according to claim 1, in which the intermediate member comprises a central region and a plurality of legs, in which the hexapod is attached to the legs.

9. A motion simulator according to claim 1, in which the intermediate member comprises a leg extending into a volume defined by the hexapod, in which the supplementary actuation assembly is attached to the leg.

10. A motion simulator according to claim 9 in which the supplementary actuation assembly is attached to the leg at a foot, the foot defined at an end of the leg distal to the platform.

11. A motion simulator comprising:
    a base and an intermediate member connected to the base by a hexapod, the hexapod comprising six actuators and being configured to move the intermediate member in six global degrees of freedom relative to the base, the six global degrees of freedom including roll, pitch and yaw;

a platform;

a joint having a first side directly fixed to the intermediate member and a second side directly fixed to the platform, which joint has degrees of freedom in the local pitch and roll axes of the intermediate member, wherein the joint is constrained in all but two rotational degrees of freedom;

a supplementary actuation assembly arranged to move the platform relative to the intermediate member in local pitch and roll axes of the intermediate member, so as to supplement global movement of the platform in at least one of the global roll and pitch degrees of freedom, wherein the supplementary actuation assembly comprises a first supplementary actuator configured to articulate the joint in at least one degree of freedom, and wherein the first supplementary actuator is a first supplementary linear actuator mounted to the intermediate member at a first end and to the platform at a second end, and wherein the hexapod is attached to the intermediate member at at least three fixing points defining a first plane, and in which the first end of the first supplementary linear actuator is positioned on a first side of the first plane, opposite to the platform.

12. A motion simulator according to claim 11, in which the first supplementary linear actuator comprises an electric motor driving a ball screw.

13. A motion simulator according to claim 11, in which the first supplementary linear actuator is connected to the platform at a position spaced from the joint so as to produce a moment on the platform.

14. A motion simulator according to claim 11, in which the supplementary actuation assembly is a parallel manipulator having at least two functionally parallel actuators.

15. A motion simulator according to claim 14, in which the supplementary actuation assembly comprises a second supplementary linear actuator mounted to the intermediate member at a first end and to the platform at a second end.

16. A motion simulator according to claim 15 in which the second ends of the first and second supplementary linear actuators are spaced apart on the platform.

17. A motion simulator according to claim 11, in which the six actuators of the hexapod comprise linear actuators, and in which the first supplementary linear actuator has an excursion less than any of the linear actuators of the hexapod.

* * * * *